United States Patent
Osmanis et al.

(10) Patent No.: US 12,432,328 B2
(45) Date of Patent: Sep. 30, 2025

(54) SYSTEM AND METHOD FOR RENDERING THREE-DIMENSIONAL IMAGE CONTENT

(71) Applicant: Lightspace Technologies, SIA, Marupes novads (LV)

(72) Inventors: Ilmars Osmanis, Mārupes nov. (LV); Roberts Zabels, Riga (LV); Kriss Osmanis, Babī>tes nov. (LV); Roberts Gotlaufs, Madonas nov. (LV); Marcis Greitans, Garkalnes nov. (LV); Kristians Slics, Lī>vānu nov. (LV); Elza Lina Linina, Riga (LV)

(73) Assignee: Lightspace Technologies, SIA, Marupes novads (LV)

( * ) Notice: Subject to any disclaimer, the term of this patent is extended or adjusted under 35 U.S.C. 154(b) by 0 days.

(21) Appl. No.: 17/213,374

(22) Filed: Mar. 26, 2021

(65) Prior Publication Data

US 2022/0311984 A1    Sep. 29, 2022

(51) Int. Cl.
*H04N 13/172* (2018.01)
*G02B 30/34* (2020.01)
(Continued)

(52) U.S. Cl.
CPC .......... *H04N 13/122* (2018.05); *G02B 30/34* (2020.01); *H04N 13/128* (2018.05); *H04N 13/15* (2018.05); *H04N 13/161* (2018.05); *H04N 13/172* (2018.05); *H04N 13/194* (2018.05); *H04N 13/332* (2018.05); *H04N 13/366* (2018.05)

(58) Field of Classification Search
USPC ........................................................ 348/52
See application file for complete search history.

(56) References Cited

U.S. PATENT DOCUMENTS

| 2005/0135390 A1* | 6/2005 | Anderson | H04L 12/6418 370/401 |
| 2013/0287090 A1* | 10/2013 | Sasaki | H04N 19/30 375/240.01 |
| 2021/0014473 A1* | 1/2021 | Hua | G02B 30/10 |

FOREIGN PATENT DOCUMENTS

| WO | 2016105521 A1 | 6/2016 |
| WO | 2019143688 A1 | 7/2019 |

(Continued)

OTHER PUBLICATIONS

European Patent Office, Extended European Search Report, Application No. 22162141.0, Mailed Jul. 22, 2022, 10 pages.

*Primary Examiner* — Mikhail Itskovich
(74) *Attorney, Agent, or Firm* — ZIEGLER IP LAW GROUP, LLC.

(57) ABSTRACT

A system for rendering three-dimensional image content for a multi-focal display device. The system includes a first processing sub-system configured to divide the three-dimensional image content into a plurality of virtual depth planes, associate each of the plurality of virtual depth planes with one of a first set of displays and a second set of displays of the multi-focal display device, and generate a first array including the plurality of virtual depth planes. The system also includes a transmission sub-system configured to provide a data channel for transmission of the generated first array. The system further includes a second processing sub-system configured to receive the generated first array and to render the three-dimensional image content in the multi-focal display device based thereon.

17 Claims, 7 Drawing Sheets

(51) Int. Cl.
*H04N 13/122* (2018.01)
*H04N 13/128* (2018.01)
*H04N 13/15* (2018.01)
*H04N 13/161* (2018.01)
*H04N 13/194* (2018.01)
*H04N 13/332* (2018.01)
*H04N 13/366* (2018.01)

(56) References Cited

FOREIGN PATENT DOCUMENTS

| | | | |
|---|---|---|---|
| WO | 2020010018 | A1 | 1/2020 |
| WO | 2020025097 | A1 | 2/2020 |

* cited by examiner

SYSTEM AND METHOD FOR RENDERING THREE-DIMENSIONAL IMAGE CONTENT

TECHNICAL FIELD

The present disclosure relates generally to display devices; and more specifically to a system and a method for rendering three-dimensional image content for a multi-focal display device. Further, the present disclosure relates to a head mounted display implementing the disclosed system.

BACKGROUND

Near-to-eye displays such as, stereoscopic head-mounted displays used for representation of three-dimensional images to the eyes of a viewer is a challenging task. Such near-to-eye displays may be implemented as see-through displays and may be used for augmentation of reality that alters human perceptions, boost cognition and decision making. Conventional stereoscopic head-mounted displays utilize single display plane. Herein, in order to observe a sharp image, the human eye is forced to accommodate at a distance and the binocular vergence cues provide a sense of three-dimensional depth. This causes a forceful decoupling of naturally coupled mechanisms of vergence and accommodation which manifest as blurred vision when accommodating at close distances. Moreover, the forceful decoupling of naturally coupled mechanisms of vergence and accommodation causes excessive eye-strain and overall exhaustion of human visual system. Thus, the conventional stereoscopic head-mounted displays are ill-suited for near-work manual tasks such as, assembly and repair, medical procedures, design tasks and the likes which actively involve human participation.

In order to mitigate the vergence-accommodation conflict in stereoscopic head-mounted displays some solutions have been proposed. Conventionally, a multi-focal display architecture may substantially mitigate adverse effects typically encountered in single focal-plane systems. For example, varifocal display technologies such as, a varifocal display system having two discrete focal planes have been used to help in mitigating severity of vergence-accommodation conflict; however, such display systems rely on information received from an eye-tracker for deciding when to switch focal planes. The introduction of the eye-tracker complicates the system and can introduce processing delays. Moreover, toggling between two discrete image planes may cause noticeable image artefacts during abrupt transition, thus, degrading an image quality. Alternatively, light-field displays may be used. The light-field displays can convey monocular focus cues and can overcome limitations imposed by vergence-accommodation conflict attributed to single focal plane systems; however, light-field display systems are computationally more demanding especially when large image resolution is required. This may put additional bandwidth requirements on data transmission or may require utilization of compression algorithms which may introduce image artefacts.

Variations overcoming these limitations are typically, bulky and/or suffer from image artefacts, flicker or colour breakup. Additionally, such systems are often characterized by limited eye box. For instance, holographic displays may be used. On one hand true holographic displays are computationally, highly demanding thus they often struggle in achieving real-time capable operation. Proposed approximations to yield a reasonable computational yield may introduce approximations that degrade the image quality. Furthermore, wavefront recreation requires coherent light sources such as, lasers of visible spectrum. Utilization of coherent laser sources even with mitigation in place can result in noticeable speckle patterns, which are unpleasant to the eye and can be considered as the image artefact.

To provide required computational power, some display systems employ external processing unit which is disposed in communication with the display unit. That is, convenient and performance-based design of head-mounted displays and smart glasses is achieved by coupling the head-mounted display with a computational pack. Herein, battery and computational pack are separate from the head-mounted display. Such head-mounted displays are nevertheless mobile, light and provide freedom of movement. Moreover, since the head-mounted display is light, a reduced mass may need to be positioned on the head. Operational time also increases due to its ability to incorporate the battery with larger capacity. Nevertheless, the computational pack is wired to the head-mounted display system and hence, it locally interferes with the mobility of the user. Additionally, the placement of computational pack on a side or a back might also interfere with the movement. Moreover, when image depth planes are transferred from the computational pack to the head-mounted display, one or more pixels between adjacent virtual planes may be compromised which may ultimately lead to image artefacts. Also, when connecting the computational pack to the head-mounted displays, plug-in connections, for example USB type-C sockets or similar, are used. However, plug-in connections can be unreliable and while the user is moving, the plug-in connection can be compromised which leads to loss in data and unreliable operation. The new standards have very fine pitch spacing between contacts and even on locking plug-in connections and using strain relief, some connections may be compromised or temporarily disconnected, which leads to a continuousness data transmission with errors. Therefore, a wireless connection of the computational pack to the head-mounted display can be more reliable. Furthermore, the image depth planes for each of the eyes may not be communicated together, and thus may not be displayed simultaneously.

Alternatively, computational pack and battery may be directly incorporated within the head-mounted display itself. Through balanced weight distribution the ergonomics of wearing don't suffer. However, the all-in-one solution is heavier and has considerably larger footprint. Moreover, computational pack that reasonably can be incorporated are limited and the thermal management becomes highly complicated. Furthermore, the operational time might be compromised due to limited battery capacity which reasonably can be fitted within such system.

For convenience of users, preferably display systems employing external processing unit need to have no wired connections during use so as to not limit a freedom of movement. However, as multi-focal three-dimensional image datasets may be large, wireless data transmission and creation of seamless user experience in head-mounted display environment becomes challenging.

Therefore, in light of the foregoing discussion, there exists a need to overcome the aforementioned drawbacks associated with conventional systems for rendering three-dimensional image content.

SUMMARY

An object of the present disclosure is to provide a system and a method for rendering three-dimensional image content. Another object of the present disclosure is to provide a solution that overcomes at least partially the problems encountered in the prior art.

In one aspect, an embodiment of the present disclosure provides a system for rendering three-dimensional image content for a multi-focal display device comprising at least two displays with a first set of displays of the at least two displays and a second set of displays of the at least two displays, the system comprising:

a first processing sub-system configured to:
processing the three-dimensional image content to divide the three-dimensional image content into a plurality of virtual depth planes, with each of the plurality of virtual depth planes containing a portion of the three-dimensional image content;
associate each of the plurality of virtual depth planes with one of the first set of displays and the second set of displays; and
generate a first array comprising the plurality of virtual depth planes, with a first row of the first array comprising a first virtual depth plane of the plurality of virtual depth planes corresponding to the first set of displays and a second virtual depth plane of the plurality of virtual depth planes corresponding to the second set of displays, and a second row of the first array comprising a third virtual depth plane of the plurality of virtual depth planes corresponding to the first set of displays and a fourth virtual depth plane of the plurality of virtual depth planes corresponding to the second set of displays;
a transmission sub-system configured to provide a data channel for transmission of the generated first array from the first processing unit; and
a second processing sub-system configured to receive the generated first array, via the transmission link, the second processing unit configured to render the three-dimensional image content in the multi-focal display device based on the generated first array.

In one aspect, an embodiment of the present disclosure provides a method for rendering three-dimensional image content for a multi-focal display device comprising at least two displays with a first set of displays of the at least two displays and a second set of displays of the at least two displays, the method comprising:

processing the three-dimensional image content to divide the three-dimensional image content into a plurality of virtual depth planes, with each of the plurality of virtual depth planes containing a portion of the three-dimensional image content;
associating each of the plurality of virtual depth planes with one of the first set of displays and the second set of displays; and
generating a first array comprising the plurality of virtual depth planes, with a first row of the first array comprising a first virtual depth plane of the plurality of virtual depth planes corresponding to the first set of displays and a second virtual depth plane of the plurality of virtual depth planes corresponding to the second set of displays, and a second row of the first array comprising a third virtual depth plane of the plurality of virtual depth planes corresponding to the first set of displays and a fourth virtual depth plane of the plurality of virtual depth planes corresponding to the second set of displays; and
rendering the three-dimensional image content in the multi-focal display device based on the generated first array.

Embodiments of the present disclosure substantially eliminate or at least partially address the aforementioned problems in the prior art, and enable efficient rendering of the three-dimensional image content.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

Embodiments of the present disclosure will now be described, by way of example only, with reference to the following diagrams wherein.

DETAILED DESCRIPTION OF EMBODIMENTS

Figure 1:
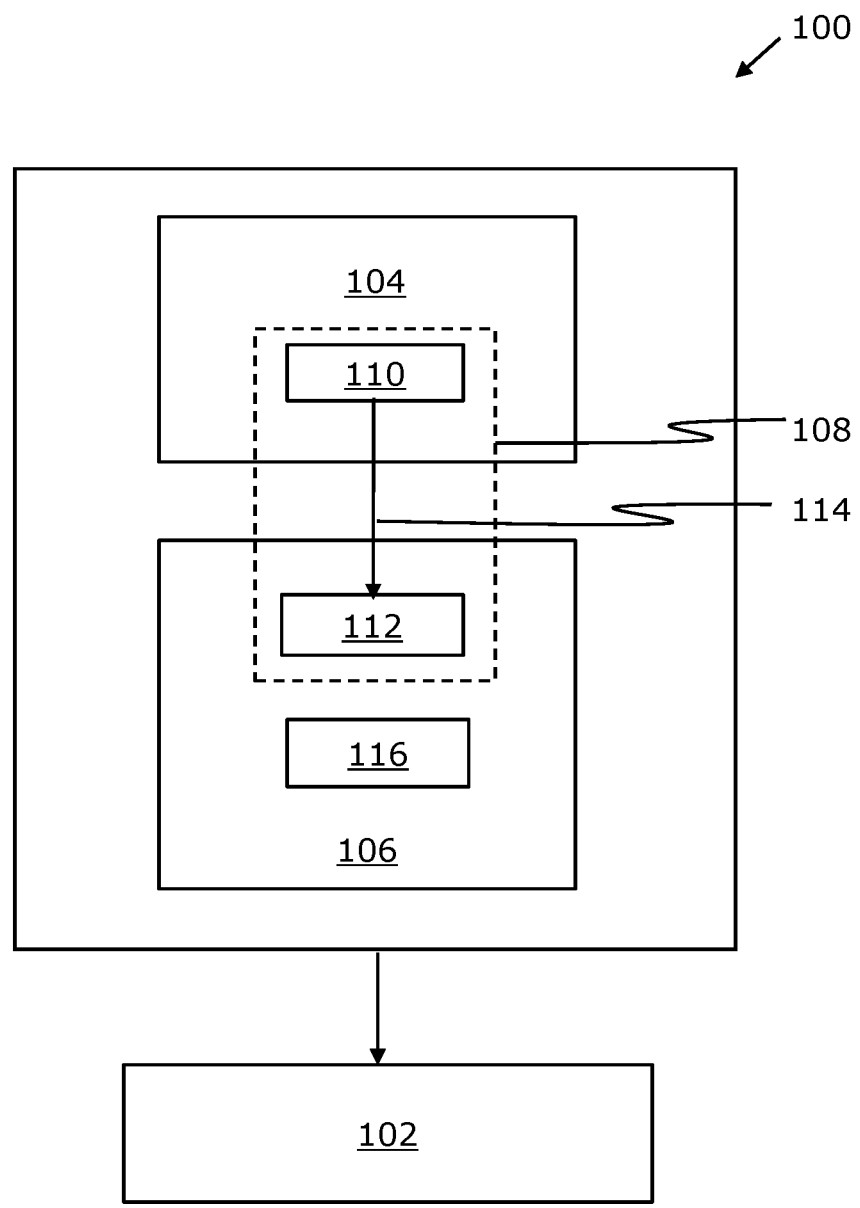
FIG. 1 is a block diagram illustration of a system for rendering three-dimensional image content for a multi-focal display device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for rendering three-dimensional image content for a multi-focal display device comprising at least two displays with a first set of displays of the at least two displays and a second set of displays of the at least two displays, the system comprising:

a first processing sub-system configured to:
process the three-dimensional image content to divide the three-dimensional image content into a plurality of virtual depth planes, with each of the plurality of virtual depth planes containing a portion of the three-dimensional image content;

associate each of the plurality of virtual depth planes with one of the first set of displays and the second set of displays; and generate a first array comprising the plurality of virtual depth planes, with a first row of the first array comprising a first virtual depth plane of the plurality of virtual depth planes corresponding to the first set of displays and a second virtual depth plane of the plurality of virtual depth planes corresponding to the second set of displays, and a second row of the first array comprising a third virtual depth plane of the plurality of virtual depth planes corresponding to the first set of displays and a fourth virtual depth plane of the plurality of virtual depth planes corresponding to the second set of displays;

a transmission sub-system configured to provide a data channel for transmission of the generated first array from the first processing unit; and a second processing sub-system configured to receive the generated first array, via the transmission link, the second processing unit configured to render the three-dimensional image content in the multi-focal display device based on the generated first array.

In one aspect, an embodiment of the present disclosure provides a method for rendering three-dimensional image content for a multi-focal display device comprising at least two displays with a first set of displays of the at least two displays and a second set of displays of the at least two displays, the method comprising:

processing the three-dimensional image content to divide the three-dimensional image content into a plurality of virtual depth planes, with each of the plurality of virtual depth planes containing a portion of the three-dimensional image content;

associating each of the plurality of virtual depth planes with one of the first set of displays and the second set of displays; and generating a first array comprising the plurality of virtual depth planes, with a first row of the first array comprising a first virtual depth plane of the plurality of virtual depth planes corresponding to the first set of displays and a second virtual depth plane of the plurality of virtual depth planes corresponding to the second set of displays, and a second row of the first array comprising a third virtual depth plane of the plurality of virtual depth planes corresponding to the first set of displays and a fourth virtual depth plane of the plurality of virtual depth planes corresponding to the second set of displays; and rendering the three-dimensional image content in the multi-focal display device based on the generated first array.

The present disclosure relates to a system for rendering three-dimensional image content for a multi-focal display device comprising at least two displays with a first set of displays of the at least two displays and a second set of displays of the at least two displays. Throughout the present disclosure, the term "three-dimensional image" relates to an image that provides a perception of depth to a user. The three-dimensional image may be a volumetric image. Herein, the volumetric image may be an image having a height, a width, and a depth in the three-dimensional space. A given three-dimensional image could be a given volumetric image of at least one three-dimensional object (for example, such as a statue, a vehicle, a weapon, a musical instrument, an abstract design, and the like), a three-dimensional scene (for example, such as a beach scene, a mountainous environment, an indoor environment, and the like), and so forth. Moreover, the term "three-dimensional image" also encompasses a three-dimensional computer-generated surface. Furthermore, the term "three-dimensional image" also encompasses a three-dimensional point cloud. In an example, a sequence of three-dimensional images can relate to a three-dimensional video (such as a three-dimensional virtual game, a three-dimensional tutorial, and the like).

The term "multi-focal display device" used herein relates to a specialized equipment for presenting the three-dimensional (3D) image content to the user in a manner that the three-dimensional image content truthfully appears to have an actual physical depth. The multi-focal display device enables the viewer to perceive the two-dimensional nature of an object as well as a depth of the object displayed within the three-dimensional image content. Examples of such multi-focal display devices include, but are not limited to, head-mounted displays (HMDs), head-up displays (HUDs), virtual-reality display systems, augmented-reality display systems, mixed-reality display systems and so forth. The multi-focal display device comprises at least two displays with the first set of displays of the at least two displays and the second set of displays of the at least two displays. The first set of displays may be used for rendering the three three-dimensional image content for a left eye of the user and the second set of displays may be used for rendering the three-dimensional image content for a right eye of the user.

In an embodiment, the at least two displays comprise at least two high-resolution micro-displays which are optically aligned on a single optical path. For an optical combination, a beam-splitter may be used. Preferably the micro-displays may be self-emissive such as an OLED or an inorganic LED (i-LED). Nevertheless, LCD based micro-displays with illuminated backplane also may be used. In some examples, the three-dimensional image content rendered on the micro-displays is magnified by an eyepiece. In order to render the plurality of virtual depth planes, the micro-displays may be positioned at slightly different distances from the eyepiece. Furthermore, the location of the micro-displays is such that it is disposed between an effective focal distance of the eyepiece, thus, resulting in plurality of virtual depth planes at distances closer than infinity.

One of the peculiarities of utilizing at least two micro-displays for generation of plurality of virtual depth planes, is the possibility to render the plurality of virtual depth planes virtually simultaneously. That is, if the three-dimensional image content is approximated, for example, with three virtual depth planes P1, P2 and P3 with corresponding depths d1, d2, d3, the three virtual depth planes P1, P2 and P3 may be configured to be rendered virtually simultaneously. In practice, micro-displays may be configured to render the three virtual depth planes progressively, that is, in a line-by-line manner. Nevertheless, still from a standpoint of human perception the three virtual depth planes are rendered simultaneously. The most notable advantage of such multifocal display device is, eliminated break-up of virtual depth planes, which may occur in time-sequential systems, when rapid head/eye movements occur.

The multifocal display device may further comprise a spatial localization module and an inertia measuring unit (IMU). It may be noted that a cycle of rendering the three-dimensional image content may begin with localization in surrounding space, which may be determined by the spatial localization module. In an embodiment, the spatial localization module may be a visual simultaneous localization and mapping (SLAM) or a SLAM based on true depth data acquisition. The data from the IMU may be employed to calculated a pose data of the multifocal display device; typically, six degrees of freedom for the multifocal display device. Alternatively, the pose data may be calculated by an internal processing unit of the spatial localization module.

As discussed, the system comprises the first processing sub-system. The first processing sub-system may be, for example, a SOC complying to computational, footprint and power consumption constraints. The first processing sub-system may be employed to perform major processing on the 3D image content. Optionally, the first processing sub-system is configured to process the three-dimensional image content to divide the three-dimensional image content into a plurality of virtual depth planes, with each of the plurality of virtual depth planes containing a portion of the three-dimensional image content. It may be appreciated that in order to render three-dimensional image content, the three-dimensional image content may be divided into the plurality of virtual depth planes corresponding to the three-dimensional image content.

The term "virtual depth plane" as used throughout the present disclosure, refers to each of a planar portion of the three-dimensional image content. Such virtual depth planes of the three-dimensional image content when put together enable the rendering of the three-dimensional image content, such that the user may perceive the depth of the object displayed within the three-dimensional image content. For example, in an embodiment, the object to be displayed with the three-dimensional image content is a spherical ball. In such an example, the plurality of virtual depth planes of the spherical ball corresponds to a first set of circles, each having a bigger diameter than a preceding circle of the first set of circles and a second set of circles, each having a smaller diameter than a preceding circle of the second set of circles. Furthermore, the first set and the second set of circles are separated by a circle having a bigger diameter as compared to any circle within the first set or the second set of circles, such that the circle corresponds to a middle plane of the spherical ball. Moreover, when the plurality of virtual depth planes corresponding to the first set of circles, the circle having the biggest diameter and the second set of circles are arranged together and displayed to the user, the user perceives the depth associated with the spherical ball. Such rendering of the three-dimensional image content using the plurality of virtual depth planes provides a convenient technique for enabling the user to perceive the depth of the object displayed within the three-dimensional image content.

In an embodiment, the multi-focal display device relies on depth blending to mask boundaries between the plurality of virtual depth planes. It may be appreciated that for the three-dimensional image content, a single virtual depth plane may have coordinates having different depth values to account for split pixels. Herein, the split pixels are the pixels that are depth blended between two neighboring virtual depth planes to mask the boundary. In depth blending, an intensity of pixels, which are attributed to an interplanar space, which is a space between two neighboring virtual depth planes where there are no virtual depth planes, is proportionally divided between these virtual depth planes. For example, if the pixel falls exactly in the middle between the two virtual depth planes, its intensity may be divided equally between the said two virtual depth planes. That is, herein, fifty percent of the intensity may be rendered on one virtual depth plane, while the other fifty percent may be rendered on the other virtual depth plane. Similarly, if the pixel in virtual depth plane falls one third of the distance between a virtual depth plane A and a virtual depth plane B, such that the pixel is closer towards the virtual depth plane A, then the intensity may be divided so that close to seventy percent (close to 66.6 percent) of its intensity is rendered on the virtual depth plane A, while the remaining thirty percent (close to 33.3 percent) of the intensity may be rendered on the virtual depth plane B.

It may be appreciated that in rare cases majority of pixels may correspond exactly to the plurality of virtual depth planes. Typically, majority of pixels may fall within the interplanar space. Consequently, when the depth blending is performed, thresholds for depth blending may be varied. That is, in an embodiment, all pixels of the interplane space are depth-blended. In another embodiment, only a portion of the pixels of the interplane space are depth blended. For example, only pixels which are farther than the one third of distance from the virtual depth planes are depth blended. It may be noted that a depth blending ratio may be linear or non-linear. In an embodiment, the depth blending ratio may depend on the intensity of the pixel. Herein, the pixels that are dark and the pixels that are bright may have different depth blending ratios. It may be noted that the distance from the virtual depth plane, based on which a decision of depth blending ratios are made, may be an optical distance or a distance in reciprocal space or a diopter space.

The first processing sub-system is configured to associate each of the plurality of virtual depth planes with one of the first set of displays and the second set of displays. That is, once the three-dimensional image content is divided into the plurality of virtual depth planes, each of virtual depth plane of the plurality of virtual depth planes may be associated with one of the first set of displays and the second set of displays. In an example scenario, if the virtual depth plane needs to be presented near the left eye, it may be associated with the first set of displays; and if the virtual depth plane needs to be presented near the right eye, it may be associated with the second set of displays.

Optionally, the first processing sub-system is configured to generate a first array comprising the plurality of virtual depth planes, with a first row of the first array comprising a first virtual depth plane of the plurality of virtual depth planes corresponding to the first set of displays and a second virtual depth plane of the plurality of virtual depth planes corresponding to the second set of displays, and a second row of the first array comprising a third virtual depth plane of the plurality of virtual depth planes corresponding to the first set of displays and a fourth virtual depth plane of the plurality of virtual depth planes corresponding to the second set of displays. For instance, if the first virtual depth plane and the third virtual depth plane are associated with the first set of displays, and the second virtual depth plane and the fourth virtual depth plane are associated with the second set of displays; then, the first array of two rows and two columns may be defined in which the first row of the first array may include the first virtual depth plane and the second virtual depth, and the second row may comprise the third virtual depth plane and the fourth virtual depth plane. Herein, the first virtual depth plane and the second virtual depth plane may be located adjacent to each other. Similarly, the third virtual depth plane and the fourth virtual depth plane may be located adjacent to each other.

It may be appreciated that transmitting each virtual depth planes one by one for rendering may not be feasible. Each of the virtual depth plane may be transmitted for rendering in a form of a packet. Herein, the first array may act as such data packet. It may be noted that in order to generate the first array, the first processing sub-system may run a host application, which may take the pose data and may provide rendering instructions based on the received pose data to its graphics processing unit. The graphics processing unit may form the first array in accordance to principles of architecture of the multi-focal display device. In an embodiment, the first array may be generated by arranging the associated each of the plurality of virtual depth planes in a composite mosaic, which may be compressed and transferred to a second processing sub-system via a data channel.

The system comprises the transmission sub-system configured to provide the data channel for transmission of the generated first array from the first processing unit. Herein, the transmission sub-system may be a wireless transceiver that may wirelessly couple the second processing sub-system and the first processing sub-system. The wireless transceiver may receive and send data from/to the second processing sub-system via a first wireless transceiver which may be an integral part of the first processing sub-system and a second wireless transceiver which may be an integral part of the second processing sub-system. In an alternative embodiment, the transmission sub-system may provide the said data channel via a wired connection.

Optionally, the first processing sub-system is located external to the multi-focal display device and the second processing sub-system is disposed internal to the multi-focal display device. As discussed, the major processing of dividing the three-dimensional image content into the plurality of virtual depth planes is done by the first processing sub-system. Hence, the first processing sub-system may be a processor of higher configuration. If the first processing sub-system is located inside the multi-focal display device, the multi-focal display device may become bulky. Moreover, heat generated from the first processing sub-system may limit the operation of the multi-focal display device. Hence, the first processing sub-system may be located external to the multi-focal display device.

As discussed, in an embodiment, the multi-focal display device may be the head-mounted display. In operation the head-mounted display may be worn by the user, while the first processing sub-system may be located separately. For example, the first processing sub-system may be a personal computer with dedicated high-performance graphics processing unit within a same room, as the user. This may enable freedom for movement, light-weight construction of the head-mounted display, optimized thermal management and performance. Alternatively, the first processing sub-system may be a cloud-based rendering solution and the wireless transceiver as discussed, may be considered as a 5G base station.

The system comprises the second processing sub-system configured to receive the generated first array, via the transmission sub-system. The second processing sub-system is configured to render the three-dimensional image content in the multi-focal display device based on the generated first array. As discussed, the second processing sub-system may be located internal to the multi-focal display device. The second processing sub-system may receive the first array from the first processing sub-system via the transmission sub-system and may render the three-dimensional image content based on the received first array.

It may be noted that compression of the first array may be a necessity when using the first processing sub-system that is located externally to the multi-focal display device and a split-mode rendering approach is employed. The three-dimensional image content may be of two types, a true volumetric image such as, a medical data obtained by tomography methods and a computer-generated three-dimensional image content with texture overlays. In volumetric images, translucency of the virtual depth planes that are closest to the user may results in visible deeper virtual depth planes. Thus, for a given coordinate X-Y, there may multiple pixels at different virtual depth planes, which all contribute to the rendering of the three-dimensional image content. In contrast, when computer generated surfaces are considered, if no translucent virtual depth plane is in the front, there is no need to render the virtual depth planes which are located behind or otherwise are blocked by front virtual depth plane. In such cases, a simplification of sending a prerendered virtual depth planes with corresponding virtual depth planes map may yield a better data efficiency possibly allowing to avoid using compression.

Optionally, the first processing sub-system is configured to discard one or more virtual depth planes having no substantial information related to three-dimensional image content from the plurality of virtual depth planes, while generating the first array. In an embodiment, an adaptive image output may be employed. That is, when the three-dimensional image content is rendered on the first processing sub-system, analysis may be performed. In some cases, it may occur that not all virtual depth planes are carrying image information. That is, some virtual depth planes may be blank and may not carry useful information. It may be appreciated that the three-dimensional image content occupies a certain space in the depth, which may be represented by $N-1$, $N-2$ etc. virtual depth planes, where N may be the maximum displays in the first set of displays or the maximum displays in the second set of displays. Furthermore, depth blending may be configured to force utilization of lesser virtual depth planes. When doing so, by discarding such virtual depth planes, a data transmission bandwidth may be spared and a higher image frame repetition rate by transmission through the data channel may be achieved at similar bandwidth. This may lower delays from the first processing sub-system to the second processing sub-system and the three-dimensional image content rendered on the multi-focal display device may be smooth.

Optionally, the first processing sub-system is configured to encode signaling information indicative of at least one of number of virtual depth planes in the first array and location of virtual depth planes in the first array, in a header of the generated first array. When the image information in the form of the first array is transmitted from the first processing sub-system to the second processing sub-system via the data channel, the corresponding signaling information in the first array indicates the number of virtual depth planes in the first array and the location of the virtual depth plane in the first array, so that the first array may be decoded accordingly in the second processing sub-system. In an embodiment, the signaling information may be encoded in the header of the generated first array. For the robustness of the transmitted signaling information, cyclic redundancy check (CRC) may be applied. Alternatively, the header may contain multiple copies of the signaling information which upon being received by the second processing sub-system may be compared as a redundancy mechanism for excluding data corruption. Alternatively, the signaling information may be sent over multiple headers and may be gathered at the second processing sub-system to perform comparison. In an embodiment, at least three data entities carrying the signaling information may be gathered and compared amongst each other. If all of the data entities coincide, the signaling information may be assumed to be uncorrupted. In another embodiment, at least five data entities carrying the signaling information may be gathered to yield a decision on a corruption state of the received signaling data. In yet another embodiment, ten data entities carrying the signaling information may be gathered to decide on the corruption state.

Optionally, the second processing sub-system is configured to decode the signaling information for pre-configuring the multi-focal display device prior to or in parallel to processing of the generated second array, for rendering of the three-dimensional image content in the multi-focal display device. As discussed, the signaling information may be added in the header of the first array and may be transmitted to the second processing sub-system. The first array along with the header information may be received substantially simultaneously by the second processing sub-system. The second processing sub-system may decode the signaling information and may check the corruption state. In an embodiment, the signaling information may be decoded first so that the multi-focal display device may be configured prior to the processing of the generated second array. In another embodiment, the signaling information may be decoded parallel to processing of the generated second array. That is, herein, the signaling information may be decoded simultaneously at a time when the generated second array is processed. Depending on the decoded signaling information the multi-focal display device may be configured.

Optionally, the transmission sub-system is configured to provide an auxiliary data channel for transmission of the header of the generated first array with the signaling information to the second processing sub-system. The auxiliary data channel may be used for transmission of the header of the first array. The auxiliary data channel may allow for faster transmission of the header information as compared to if the header information was being transmitted by the regular data channel. In this way, the header of the generated first array with the signaling information may be received by the second processing sub-system before first array is fully received by the second processing sub-system. Hence, the demultiplexer of the second processing sub-system may get ready before hand to accept the generated first array. It may be noted that, in an embodiment, the auxiliary data channel may be a separate low data throughput data channel through which the first processing sub-system sends may send the decoded extracted signaling data as is or in a reformatted form to the demultiplexer. This is of special importance when graphical data are throughput to the multi-focal image engines via the demultiplexer without buffering of at least line of 2N−1 virtual depth planes.

It may be noted that once the first array is generated by the first processing sub-system, the first array may be compressed using, for example, a high efficiency video coding and may be wirelessly transmitted towards the second processing sub-system, where it may be received and decoded via the encoder/decoder unit. Subsequently the first array may be processed by the graphics processing unit. The processed first array may be transferred to the demultiplexer via a graphics interface such as, but not limited to, HDMI, DisplayPort and MIPI-DSI. The demultiplexer may perform image unpacking and demultiplexing into corresponding virtual depth planes that may be transmitted to the multi-focal display device which the user perceives as the three-dimensional image content.

In particular, the compressed graphical data stream may be decompressed by a dedicated hardware decoder/encoder, which can be a part of the second processing sub-system or a separate unit communicably coupled to the second processing sub-system. As the graphical data are decompressed, they are buffered within the random-access memory of the processing unit which is accessible by the dedicated graphics processing unit. The dedicated graphics processing unit optionally can perform a calculation (data manipulation) on the received graphical data. The calculation or data manipulation may include any one of or a combination of: data reformatting, "boundary-pixel" removal, geometrical transformation (pixel shift, perspective correction, image stretching/compression and similar), image pixel arrangement reformatting (pixel scrambling).

Optionally, the first processing sub-system is further configured to add one or more boundary columns between the first virtual depth plane and the second virtual depth plane in the generated first array, and wherein the one or more boundary columns comprise a first set of additional pixels corresponding, at least in part, to the three-dimensional image content at adjacent pixels of the first virtual depth plane and the second virtual depth plane and add one or more boundary rows between the first row and the second row in the generated first array, and wherein the one or more boundary rows comprise a second set of additional pixels corresponding, at least in part, to the three-dimensional image content at adjacent pixels of the first row and the second row in the generated first array. As discussed, the first array comprising the plurality of virtual depth planes may be generated and transmitted to the second processing sub-system. It may be appreciated that when forming the first array of a given resolution of K×L on which it is intended to apply H.265 image compression algorithm some image details might become compromised, especially, at the boundary between the virtual depth planes. Thus, upon decoding, a simple division into the corresponding virtual depth planes may yield image artefacts. For example, in a first array comprising a first virtual depth plane and a second virtual depth plane, with a last pixel column of the first virtual depth plane having white pixels and a first column of the second virtual depth plane having black pixels; and when such first array is decoded wrongly, such that the first virtual depth plane is decoded beyond the last column of the first virtual depth plane and into the first column of the second virtual depth plane, the variation in color may cause abrupt change in the decoded boundaries. In the given example, just after the color white, the color black may appear in the first virtual depth plane. In order to avoid such image artefacts, one or more boundary columns comprising the first set of pixels may be appended between the first virtual depth plane and the second virtual depth plane in the generated first array, so that even when the first array is decoded wrongly, the image artefacts may be avoided. Similar to the columns, the image artefacts may also occur along the rows when the first array is decoded. For example, in an exemplary first array, the first virtual depth plane may be arranged in the first row and the third virtual depth plane may be arranged in the second row of the array, just below the first virtual depth plane. Herein, a last row of the first virtual depth plane may have white pixels and a first row of the third virtual depth plane may have black pixels; hence, while decoding the first array, if the first virtual depth plane is decoded beyond the first row of the first array, the last row of the decoded first virtual depth plane may comprise black pixels. This may lead to abrupt change in colors towards the boundary. In order to mitigate such issues, the one or more rows may be added between the first row and the second row of the first array, so that even if the first array is decoded wrongly, the image artefacts may be avoided.

Optionally, the first set of additional pixels follow a color gradient corresponding, at least in part, to colors of the adjacent pixels of the first virtual depth plane and the second virtual depth plane, and wherein the second set of additional pixels follow a color gradient corresponding, at least in part, to colors of the adjacent pixels of the first row and the second row in the generated first array. The color gradient may be variation in color from a first color to a second color. As discussed, one or more boundary columns comprising the first set of pixels between the first virtual depth plane and the second virtual depth plane may be added in the generated first array. In an example, if the last column of the first virtual depth plane is white and the first column of the second virtual depth plane is black, the one or more columns comprising the first set of pixels that follow the color gradient such that, the color changes gradually from white near the last column of the first virtual depth plane to black near the first column of the second virtual depth plane may be added. Hence, herein, even if the first array with the added one or more boundary columns may be divided wrongly, chances of major image artefacts occurring may be reduced. That is, even if the first virtual depth plane is decoded by cutting the first array beyond the last column of the first virtual depth plane, there would not be an abrupt change in colors due to the color gradient. Similarly, the second set of additional pixels follow a color gradient corresponding, at least in part, to colors of the said adjacent pixels. For example, if the adjacent pixels of the first row are white and the adjacent pixels of the second row are black, the one or more rows added between the first row and the second row may include additional pixels such that the color varies from white near the first row to black near the second row. In this way, even if the image is decoded wrongly, such that the first virtual depth plane is decoded beyond the first row, the chances of image artefacts are reduced.

In an embodiment, the first array of size K×L may be enlarged to K'×L', where additional pixels are introduced at the boundaries between the two virtual depth planes arranged in the first array. Furthermore, pixel values of introduced additional pixels may be determined by calculating the color gradient from the pixels on one virtual depth plane to the pixels of another virtual depth plane. Consequently, upon decoding, the added boundary pixels may be discarded, thus minimizing occurrence of image possible artefacts due to the use of compression algorithms.

Optionally, the second processing sub-system is configured to process the received generated first array to discard the one or more boundary columns and the one or more boundary rows, before further processing of the first array therein for rendering the three-dimensional image content. Herein, the one or more boundary columns inserted between the first virtual depth plane and the second virtual depth plane may be discarded. Moreover, the one or more rows added between the first row of the first array and the second row of the first array may be discarded. Once, the one or more boundary columns and the one or more boundary rows are discarded, the processed array may further be implemented for rendering the three-dimensional image content therefrom.

Optionally, the system further comprises an inertial measurement unit associated with the multi-focal display device and configured to provide a pose data therefor, wherein the second processing sub-system is configured to process the first array to transform the first array based on the pose data to generate an intermediate array. As discussed, herein, the inertial measurement unit (IMU) may be positioned inside the multi-focal display device and may be configured to measure its movement. For example, the inertial measurement unit may be positioned inside the head-mounted display and may be configured to measure acceleration, angular acceleration, angular velocity, linear velocity or a tilt of a head of the user. Herein, the inertial measurement unit may provide a local co-ordinate of the head-mounted display with respect to its surrounding to calculate the pose data. The pose data may relate to dynamic parameters, for example acceleration, angular acceleration, angular velocity, linear velocity. The change in velocity and acceleration data in time enables to predict pose data in the future and therefore to correct the rendered image. Optionally, the pose data may relate to a position and an orientation of the head-mounted display. According to the pose data, the intermediate array may be generated.

It may be noted that in the multifocal display devices, it may be needed to perform pixel arrangement or scrambling depending on the architecture of the multi-focal display device. In a preferred embodiment, the architecture is configured to render the plurality of virtual depth planes substantially simultaneously thus avoiding split-up of the virtual depth plane. In an alternative embodiment, the multifocal display device is configured to support only time-sequential virtual depth planes. In order to exploit full potential of the preferred embodiment, pixel scrambling or rearrangement is performed to fit the architecture of the multifocal display device. It may also be noted that microdisplays render the three-dimensional image contents line by line progressively. Hence, ideally all first lines may be sent simultaneously to all micro-displays. Next, all second lines may be sent simultaneously to all micro-displays and so on. However, the transmission may also occur progressively line by line. Hence, the pixels in the generated intermediate array may be processed to form the second array.

Optionally, the second processing sub-system is configured to process the generated intermediate array to generate a second array, with a first row of the second array comprising a first row of pixels of each of the first virtual depth plane, the second virtual depth plane, the third virtual depth plane and the fourth virtual depth plane, and a second row of the second array comprising a second row of pixels of each of the first virtual depth plane, the second virtual depth plane, the third virtual depth plane and the fourth virtual depth plane and process the generated second array to render the three-dimensional image content in the multi-focal display device. Herein, the second array may be generated based on the architecture of the multi-focal display device. The second array may be generated by placing the first row of pixels of each of the first virtual depth plane, the second virtual depth plane, the third virtual depth plane and the fourth virtual depth plane of the generated intermediate array into the first row of the second array. Next, the second row of pixels of each of the first virtual depth plane, the second virtual depth plane, the third virtual depth plane and the fourth virtual depth plane of the generated intermediate array may be placed into the second row of the second array. This may be continued till all rows of pixels of each of the first virtual depth plane, the second virtual depth plane, the third virtual depth plane and the fourth virtual depth plane are accommodated in the second array.

In an alternative embodiment, the pixels may be reformatted in the generated intermediate array in another format. For example, in case three virtual depth planes, P1, P2 and P3, are associated with the first set of displays corresponding to the right eye and three virtual depth planes, P1', P2' and P3', are associated with the second set of displays corresponding to the left eye, the first row of the second array is formed by the first row of P1 and the first row of P1', the second row of second array is formed by the first row of P2 and the first row of P2' and the third row of the second array is formed by the first row of P3 and the first row of P3' with subsequent rows of the second array holding further rows of the corresponding virtual depth planes following the same pattern. Essentially, the second array is generated by pixel scrambling the generated intermediate array. It may be noted that different arrangements are also valid, for example, scrambling on individual pixel level.

Optionally, the system further comprises comprising a buffer memory associated with the second processing sub-system, wherein the buffer memory is configured to temporarily store the first row of the second array when generated by the second processing sub-system, to be used along with the second row of the second array when generated, for processing of the generated second array by the second processing sub-system. It may be noted that in order to ensure simultaneous rendering of the virtual depth plane and to minimize possible time delays between the virtual depth planes and between the left and the right eyes, the second processing sub-system may transmit data to the demultiplexer in a way that minimizes this delay. Thus, the demultiplexer can operate without the buffer memory with minimum time delays between the virtual depth planes ensuring virtually simultaneous rendering of the three-dimensional image content. Alternatively, the image demultiplexer may comprise the buffer memory to store at least first row of all virtual depth planes, when simultaneous transmission to the multi-focal display device is initiated. In such configurations the time delays between rendering of each of the virtual depth planes are eliminated. Nevertheless, this absolute synchronization of rendering of the virtual depth planes may come at a cost of additional signal delay due to buffering which may be very minor. Essentially the buffer memory may have to account for 2N−1 virtual depth planes, where N may be a total number of virtual depth planes for both eyes. The last virtual depth may not have to be buffered as it is output simultaneously with other 2N−1 virtual depth planes towards the multi-focal display device.

It may be noted that the multi-focal display devices may be configured to render in the time-sequential manner. Herein, initial processing steps at the first processing sub-system are similar. Nevertheless, when the first array is received at the second processing sub-system, decoded and buffered within the buffer memory accessible by the graphics processing unit, the graphics processing unit doesn't perform pixel scrambling procedure. Instead, after removal of boundary pixels, which may mitigate occurrence of possible data compression-related image artefacts, the plurality of virtual depth planes are not reformatted. Herein, layout of the plurality virtual depth planes may utilize principle of sequential image output and sequential data transmission. Consequently, herein, the demultiplexer without buffering can redirect the virtual depth plane for the left and right eye respectively, following with the virtual depth plane and so on. In one of the embodiments, when adaptive rendering to improve image repetition rate is employed, the second processing sub-system encodes signaling data within the least significant bits of the pixels of the virtual depth plane to be transmitted to the demultiplexer. In such configuration, synchronization between the second processing sub-system and the demultiplexer is not needed. Moreover, data channels between the second processing sub-system and the demultiplexer can be avoided. Instead, the signaling data arrives at the demultiplexer with the pixels of the virtual depth plane through, for example, DisplayPort connection and will ensure particular configuration of the demultiplexer and correspondingly the multi-focal display device.

Moreover, the present description also relates to the method for rendering three-dimensional image content as described above. The various embodiments and variants disclosed above apply mutatis mutandis to the method for rendering three-dimensional image content.

Optionally, the method further comprises processing the received generated first array to generate a second array, with a first row of the second array comprising a first row of pixels of each of the first virtual depth plane, the second virtual depth plane, the third virtual depth plane and the fourth virtual depth plane, and a second row of the second array comprising a second row of pixels of each of the first virtual depth plane, the second virtual depth plane, the third virtual depth plane and the fourth virtual depth plane and processing the generated second array to render the three-dimensional image content in the multi-focal display device.

Optionally, the method further comprises temporarily storing the first row of the second array when generated, to be used along with the second row of the second array when generated, for processing of the generated second array.

Optionally, the method further comprises discarding one or more virtual depth planes having no substantial information related to three-dimensional image content from the plurality of virtual depth planes, while generating the first array.

Optionally, the method further comprises encoding signaling information indicative of at least one of number of virtual depth planes in the first array and location of virtual depth planes in the first array, in a header of the generated first array.

Optionally, the method further comprises decoding the signaling information for pre-configuring the multi-focal display device prior to or in parallel to processing of the generated second array, for rendering of the three-dimensional image content in the multi-focal display device.

The system and the method of the present disclosure are advantageous as they enable truthful rendering of the three-dimensional image content on the multi-focal display device. Since, the first processing sub-system is located external to the multi-focal display device, it may provide high computational power and thermal issues of the system may be improved. Moreover, the addition of the one or more boundary rows and the one or more boundary columns may reduce chances of artefact that may occur due to loss of pixels while decoding. Furthermore, the virtual depth planes associated with the first set of displays and the second set of displays may be rendered simultaneously.

In respect to multi-focal display architecture, the improvements are achieved by way the image is formatted; i.e. division into depth or focal planes (side-by-side array), and addition of boundary pixels so that possible image artefacts are not introduced. This allows to utilize image compression (H.265, for example), without risking that the odd way of focal plane layout can introduce image artefacts, as so to avoid that, boundary pixels are added and then removed. And since, this allows for use of high image compression, remote processing could be employed without causing wireless bandwidth issues.

Therefore, multi-focal nature of the augmented reality head mounted display devices may provide superior eye-comfort. Moreover, simultaneous rendering of the plurality of virtual depth planes may eliminate breakup of the virtual depth plane. That is, image artefacts associated to misalignment between corresponding virtual depth planes, which happens when the plurality virtual depth planes are rendered time-sequentially, may be eliminated. However, it may be appreciated that the system and the method may be applied for rendering the plurality of virtual depth plane to time-sequential image plane output.

The system and the method may be used in head mounted display devices for professional use. For example, it may be used in medicine as a digital aid in surgery in order to provide digital anatomical overlays and supplemental information to a surgical team. The wireless nature of the transmission sub-system may provide comfort by eliminating dangling wires. Since, the first processing sub-system may be located externally from the augmented reality head mounted display devices, it may provide high computational power which is offloaded from the augmented reality head mounted display devices. Thus, the augmented reality head mounted display devices may be lighter and may provide better battery life as "heavy-lifting" computations is carried out by the first processing sub-system that is located externally, resulting in improved battery (operational time) and reduced weight (and use of simpler components and assembly process). Moreover, the thermal management of the augmented reality head mounted display device may be improved. That is, the augmented reality head mounted display device may not emit as much heat as it would in case the first processing sub-system is located internally which in turn adds to the user comfort when using such head mounted display devices.

DETAILED DESCRIPTION OF DRAWINGS

FIG. 1 is a block diagram illustration of a system 100 for rendering three-dimensional image content for a multi-focal display device 102, in accordance with an embodiment of the present disclosure. The multi-focal display device 102 comprises at least two displays including a first set of displays and a second set of displays. The system comprises a first processing sub-system 104, a second processing sub-system 106 and a transmission sub-system 108. The first processing sub-system 104 is configured to process the three-dimensional image content to divide the three-dimensional image content into a plurality of virtual depth planes with each of the plurality of virtual depth planes containing a portion of the three-dimensional image content. The first processing sub-system 104 is further configured to associate each of the plurality of virtual depth planes with one of the first set of displays and the second set of displays and generate a first array comprising the plurality of virtual depth planes. Herein, a first row of the first array comprises a first virtual depth plane of the plurality of virtual depth planes corresponding to the first set of displays and a second virtual depth plane of the plurality of virtual depth planes corresponding to the second set of displays. A second row of the first array comprises a third virtual depth plane of the plurality of virtual depth planes corresponding to the first set of displays and a fourth virtual depth plane of the plurality of virtual depth planes corresponding to the second set of displays. The transmission sub-system 108 comprises a first transceiver 110 and a second transceiver 112. The transmission sub-system 108 is configured to provide a data channel 114 for transmission of the generated first array from the first processing unit 104, via the first transceiver 110; and the second processing sub-system 106 is configured to receive the generated first array, via the second transceiver 112 of the transmission sub-system 108. The second processing unit 106 is further configured to render the three-dimensional image content in the multi-focal display device 102 based on the generated first array. In some embodiments the second processing sub-system 106 is configured to process the received generated first array to generate a second array. It may be observed from the FIG. 1 that second processing sub-system 106 comprises a buffer memory 116. Herein, the buffer memory 116 is configured to temporarily store a first row of a second array when generated by the second processing sub-system 106 to be used along with a second row of the second array when generated for processing of the generated second array by the second processing sub-system 106.

Figure 2:
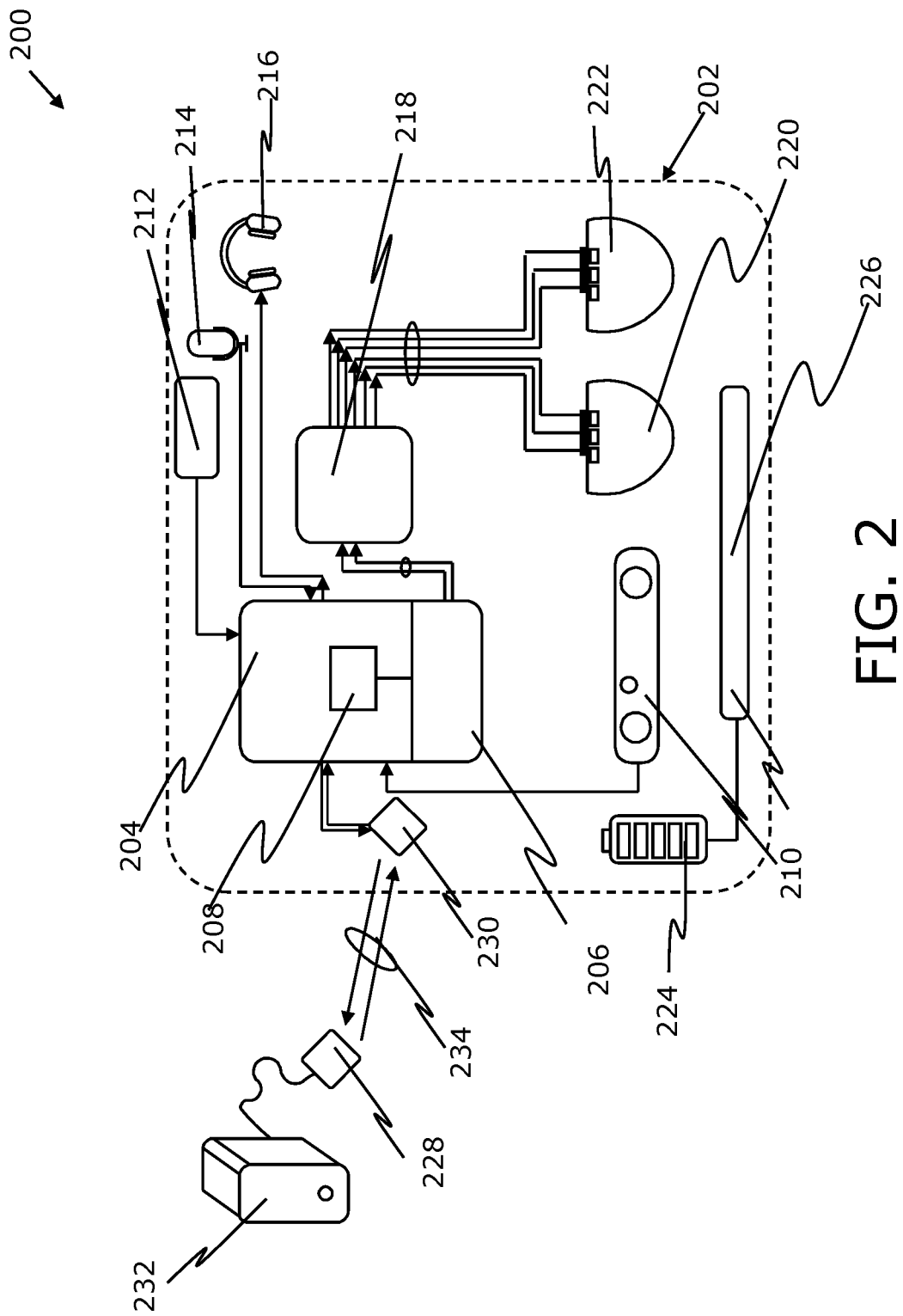
FIG. 2 is a detailed schematic illustration of the system for rendering three-dimensional image content for the multi-focal display device, in accordance with an embodiment of the present disclosure.

FIG. 2 is a detailed schematic illustration of a system 200 for rendering three-dimensional image content for a multi-focal display device 202, in accordance with an embodiment of the present disclosure. Herein, the the multi-focal display device 202 is the head-mounted display. The head-mounted display 202 comprises the second processing sub-system 204 which is built inside the head-mounted display 202. Herein, the second processing sub-system 204 is typically an integrated solution housing at least one central processing unit (not shown), a graphics processing unit 206 and an encoder/decoder unit 208. The second processing sub-system 204 is communicably coupled to a spatial localization module 210, an inertial measurement unit 212 which may be an integral part of the spatial localization module 210, a voice/sound capturing device 214 and an audio-output interface 216. The second processing sub-system 204 is also communicably coupled to a demultiplexer 218. The demultiplexer 218 is further communicably coupled to the multi-focal display devices 202 comprising a first set of displays 220 and a second set of displays 222. The head-mounted display 202 also comprises a battery 224 and a power management/distribution unit 226 responsible for powering corresponding components. The head-mounted display 202 through a first wireless data transceiver 228 and a second wireless transceiver 230 is wirelessly coupled to a first processing sub-system 232 which receives and sends data from/to the head-mounted display 202 via a data channel 234.

Figure 3:
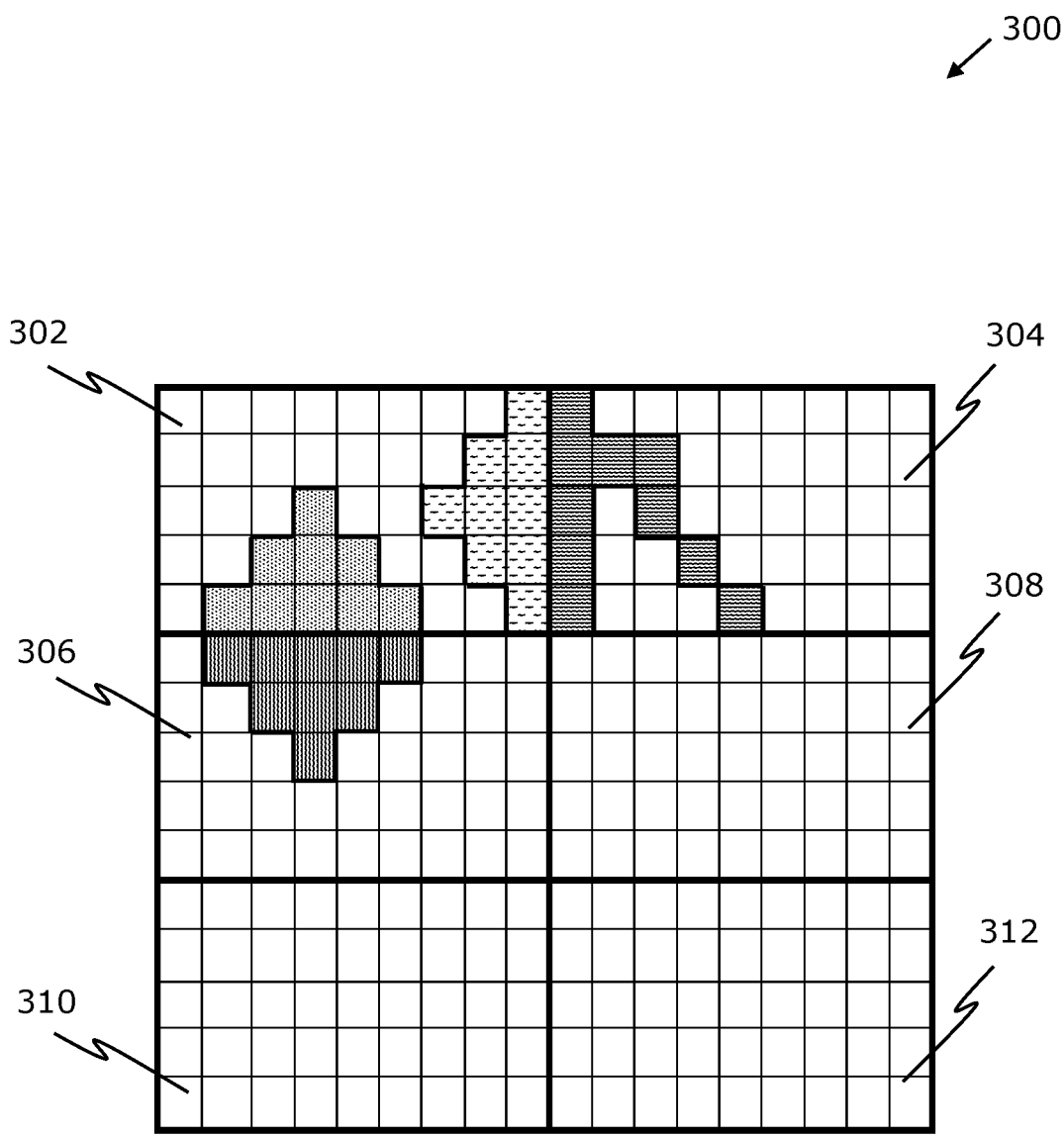
FIG. 3 is an illustration of a first array, in accordance with an embodiment of the present disclosure.

FIG. 3 is an illustration of the first array 300, in accordance with an embodiment of the present disclosure. Herein, a first row of the first array 300 comprises a first virtual depth plane 302 of the plurality of virtual depth planes corresponding to the first set of displays and a second virtual depth plane 304 of the plurality of virtual depth planes corresponding to the second set of displays. A second row of the first array comprises the third virtual depth plane 306 of the plurality of virtual depth planes corresponding to the first set of displays and the fourth virtual depth plane 308 of the plurality of virtual depth planes corresponding to the second set of displays. A third row of the first array comprises a fifth virtual depth plane 310 of the plurality of virtual depth planes corresponding to the first set of displays and a sixth virtual depth plane 312 of the plurality of virtual depth planes corresponding to the second set of displays.

Figure 4:
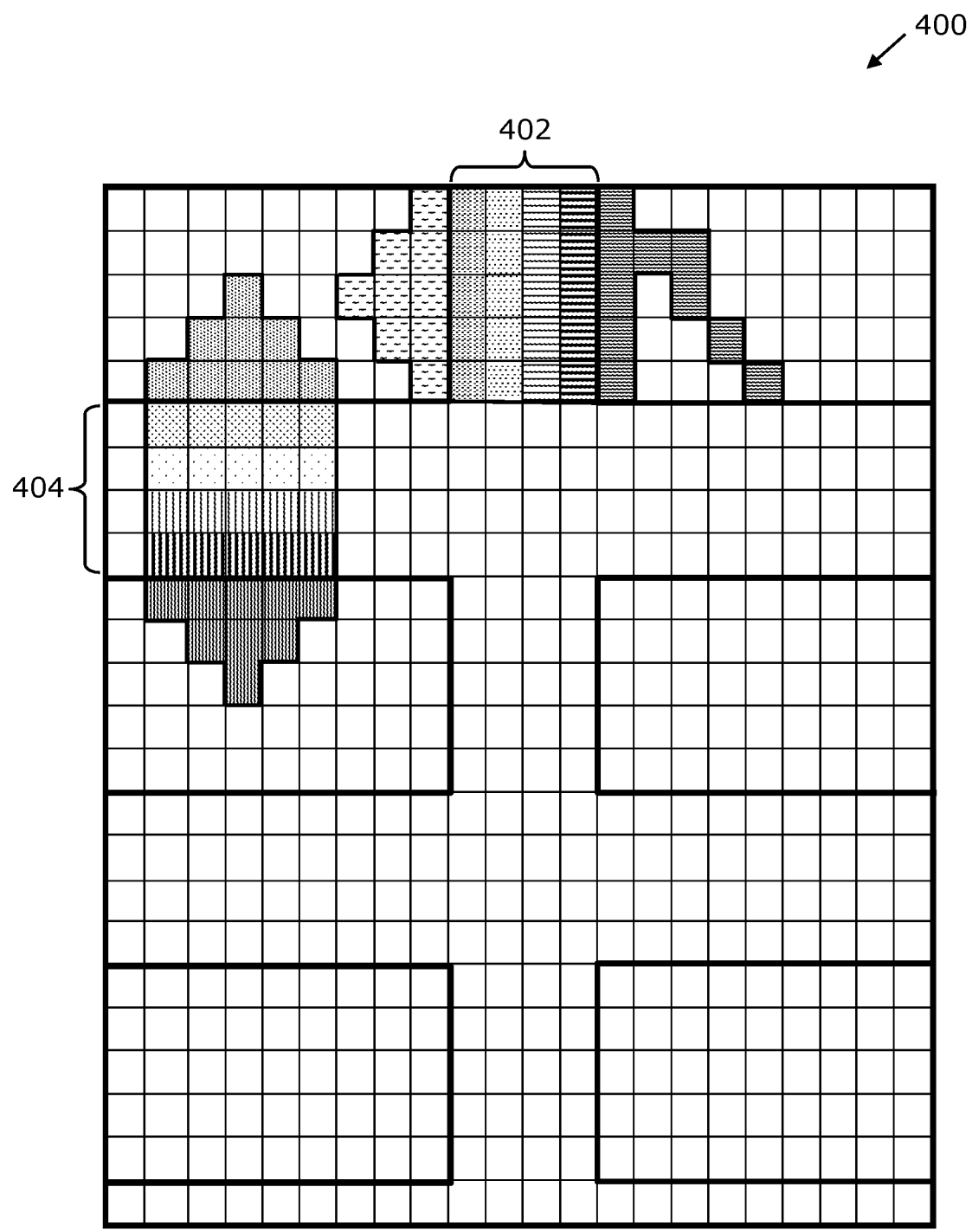
FIG. 4 is an illustration of an array formed by adding one or more boundary columns and one or more boundary rows to the first array of FIG. 3, in accordance with an embodiment of the present disclosure.

FIG. 4 is an illustration of an array 400 formed by adding one or more boundary columns and one or more boundary rows to a first array (such as, the first array 300 of FIG. 3), in accordance with an embodiment of the present disclosure. Herein, a first processing sub-system (such as, the first processing sub-system 104, 232) is configured to add one or more boundary columns 402 between the first virtual depth plane and the second virtual depth plane in the first array 300. Herein, the one or more boundary columns 402 comprise a first set of additional pixels corresponding, at least in part, to the three-dimensional image content at adjacent pixels of the first virtual depth plane 302 and the second virtual depth plane 304. The first set of additional pixels follow a color gradient corresponding, at least in part, to colors of the said adjacent pixels. The first processing sub-system is further configured to add one or more boundary rows 404 between the first row and the second row in the first array. Herein, the one or more boundary rows 404 comprise a second set of additional pixels corresponding, at least in part, to the three-dimensional image content at adjacent pixels of the first row and the second row in the first array. Herein, the second set of additional pixels follow a color gradient corresponding, at least in part, to colors of the said adjacent pixels.

Figure 5:
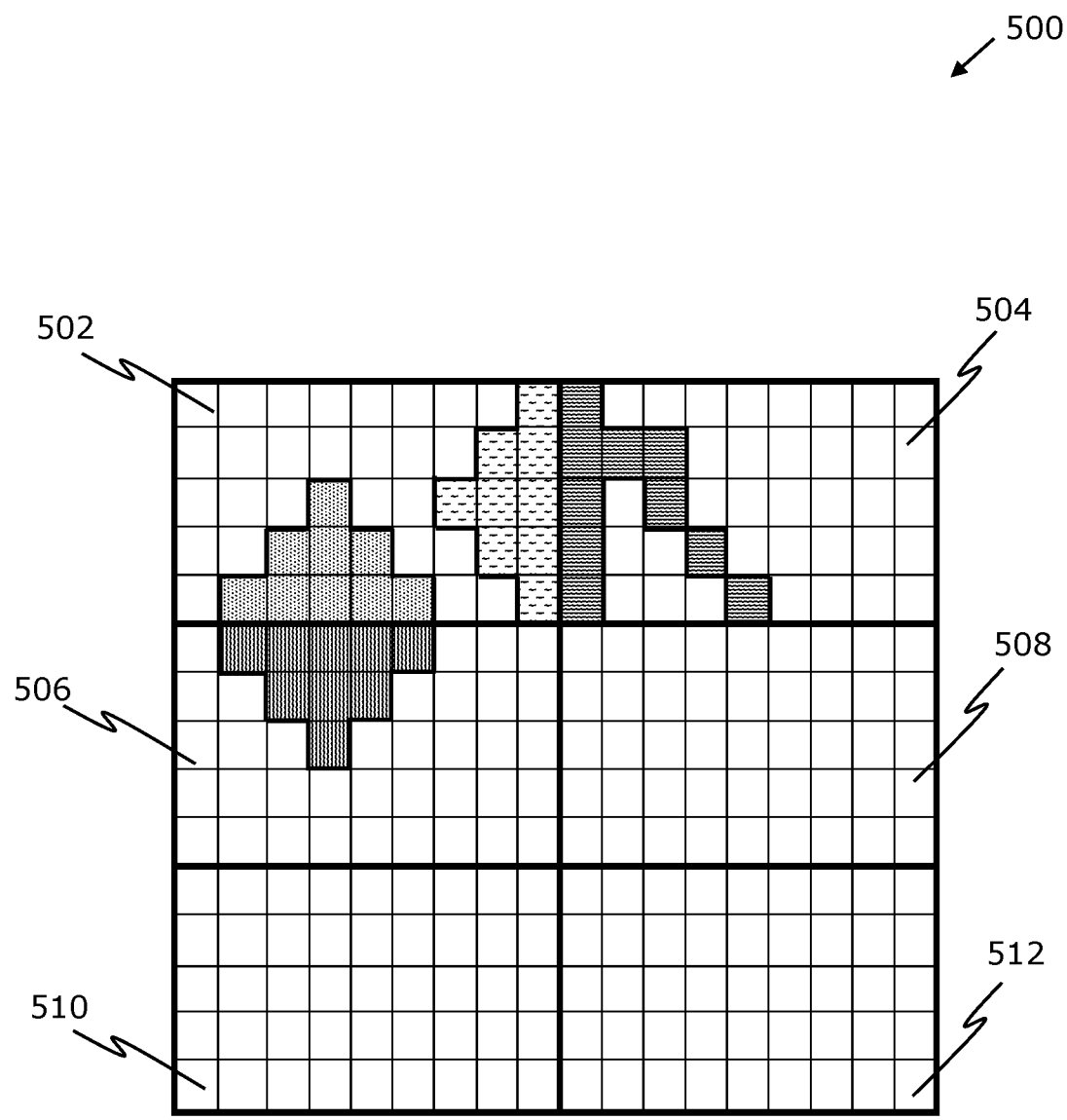
FIG. 5 is an illustration of an array formed by discarding one or more boundary columns and one or more boundary rows of the array of FIG. 4, in accordance with an embodiment of the present disclosure.

FIG. 5 is an illustration of an array 500 formed by discarding one or more boundary columns and one or more boundary rows of the array 400 of FIG. 4, in accordance with an embodiment of the present disclosure. The array 500 is formed by discarding the one or more boundary columns 402 and the one or more boundary rows 406 from the array 400. Due to the presence of the color gradient in the one or more boundary columns 402 and the one or more boundary rows 404, the array 500 has no image artefacts and is similar to the first array 300, even after processing. Subsequently, the array 500 may be cropped to obtain the first virtual depth plane 502, the second virtual depth plane 504, the third virtual depth plane 506, the fourth virtual depth plane 508, the fifth virtual depth plane 510 and the sixth virtual depth plane 512.

Figure 6:
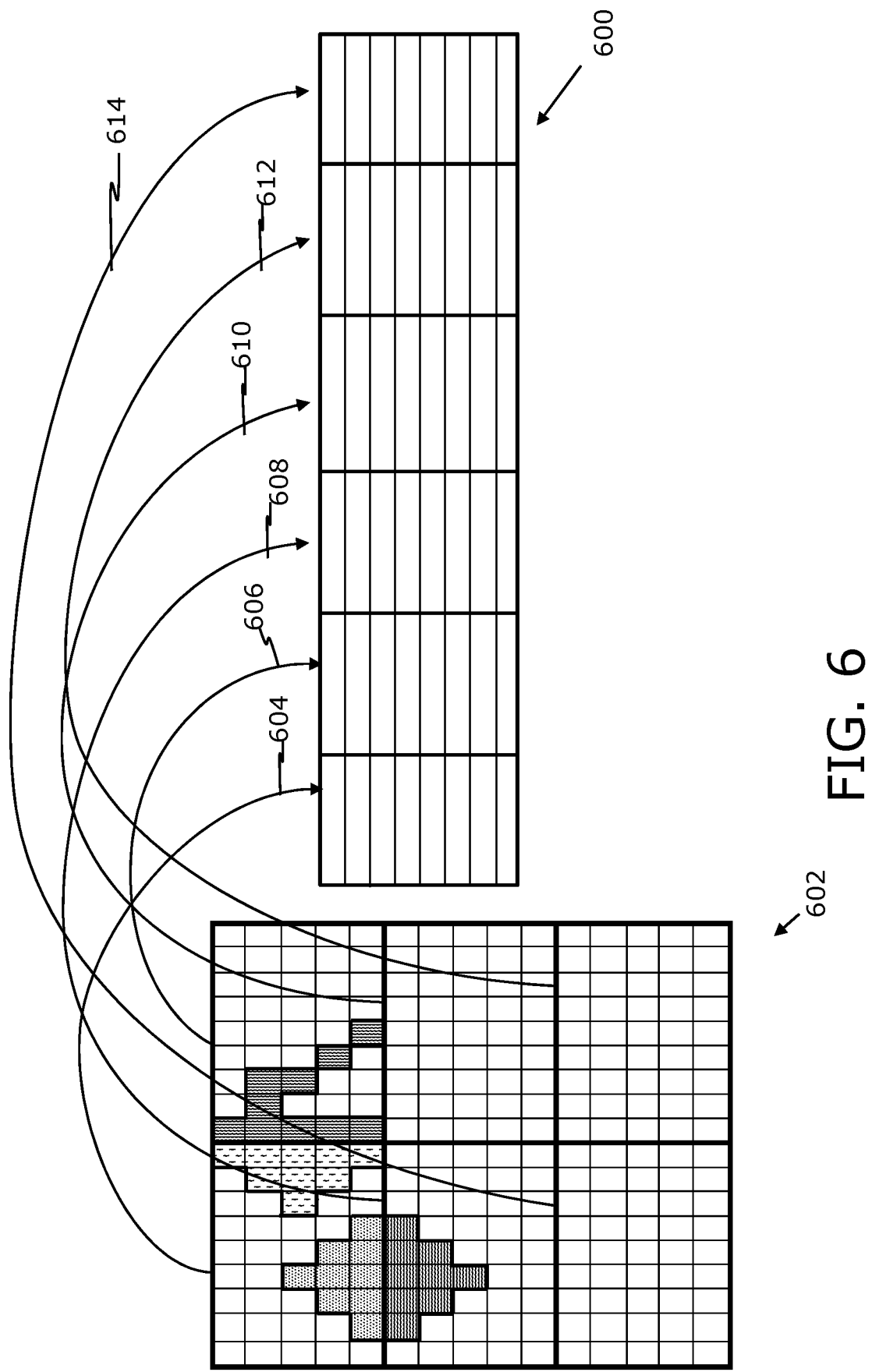
FIG. 6 is depiction of a process to from a second array by scrambling a first array, in accordance with an embodiment of the present disclosure.

FIG. 6 is a depiction of a process to from a second array 600 by scrambling a first array 602, in accordance with an embodiment of the present disclosure. Herein, the second processing sub-system (such as, the second processing sub-system 106, 204) processes received generated first array 602 to generate a second array 600. Herein, a first row of the second array 600 is generated by copying (as represented by a curve 604) a first row of pixels of the first virtual depth plane in the first array 602 into a first column of the second array 600, by copying (as represented by a curve 606) a first row of pixels of the second virtual depth plane in the first array 602 into a second column of the second array 600, by copying (as represented by a curve 608) a first row of pixels of the third virtual depth plane in the first array 602 into a third column of the second array 600, by copying (as represented by a curve 610) a first row of pixels of the fourth virtual depth plane in the first array 602 into a fourth column of the second array 600, by copying (as represented by a curve 612) a first row of pixels of the fifth virtual depth plane in the first array 602 into a fifth column of the second array 600, by copying (as represented by a curve 614) a first row of pixels of the sixth virtual depth plane in the first array 602 into a sixth column of the second array 600. Furthermore, similarly, a second row of the second array 600 is formed by copying a second row of pixels of each of the first virtual depth plane, the second virtual depth plane, the third virtual depth plane, the fourth virtual depth plane, the fifth virtual depth plane and the sixth virtual depth plane into the respective columns of the second array 600.

Figure 7:
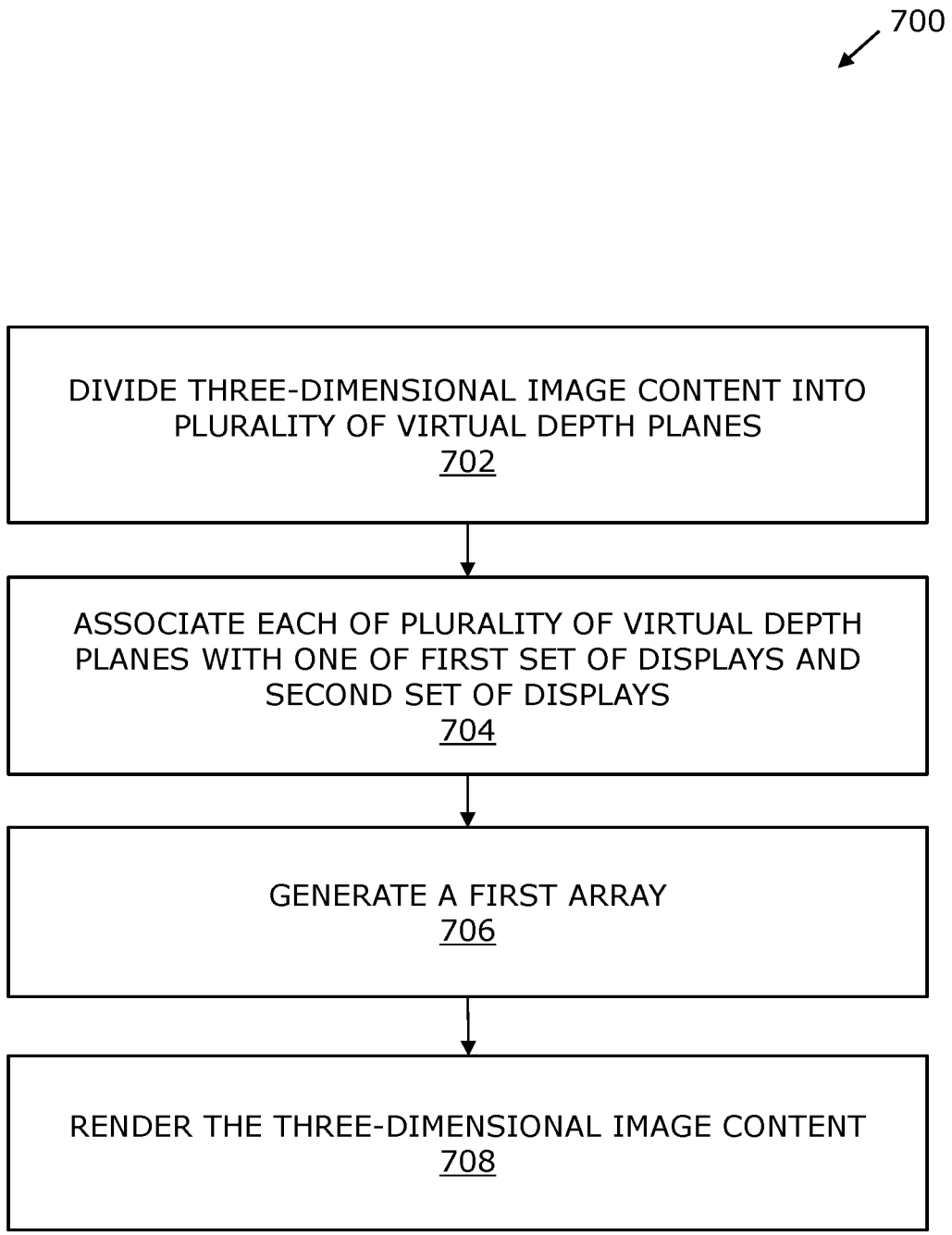
FIG. 7 is a flowchart listing steps of a method for rendering three-dimensional image content for the multi-focal display device, in accordance with an embodiment of the present disclosure.

FIG. 7 is a flowchart of a method 700 for rendering three-dimensional image content for the multi-focal display device comprising at least two displays with the first set of displays of the at least two displays and the second set of displays of the at least two displays, in accordance with an embodiment of the present disclosure. The method comprises, at step 702, dividing the three-dimensional image content into the plurality of virtual depth planes. Herein, the three-dimensional image content is processed to divide the three-dimensional image content into the plurality of virtual depth planes, with each of the plurality of virtual depth planes containing the portion of the three-dimensional image content. The method comprises, at step 704, associating each of the plurality of virtual depth planes with one of the first set of displays and the second set of displays. The method comprises, at step 706, generating the first array. Herein, the first array comprises the plurality of virtual depth planes, with the first row of the first array comprising the first virtual depth plane of the plurality of virtual depth planes corresponding to the first set of displays and the second virtual depth plane of the plurality of virtual depth planes corresponding to the second set of displays, and the second row of the first array comprising the third virtual depth plane of the plurality of virtual depth planes corresponding to the first set of displays and the fourth virtual depth plane of the plurality of virtual depth planes corresponding to the second set of displays. The method comprises, at step 708, rendering the three-dimensional image content in the multi-focal display device based on the generated first array.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A system for rendering three-dimensional image content for multi-focal display, the system comprising:
   a multi-focal head mounted display device comprising at least two first displays aligned along a first optical path for rendering the three dimensional content as virtual depth planes for a left eye, and at least two second displays aligned along a second optical path for rendering the three dimensional content as virtual depth planes for a right eye;
   a first processing sub-system physically separated and external to the head mounted display device, the first processing sub-system configured to receive a volumetric three dimensional image and transcode the volumetric three dimensional image into a multiplane composite mosaic image by:
   processing the volumetric three-dimensional image to divide the volumetric three-dimensional image into the virtual depth planes for the left and right eyes, with each of the virtual depth planes containing a portion of the three-dimensional image content; and
   generating a composite mosaic image comprising a first array of the virtual depth planes, the first array comprising:
      a first row comprising a first virtual depth plane corresponding to one of the first displays for rendering to the left eye, adjacent to a second virtual depth plane corresponding to one of the second displays for rendering to the right eye; and
      a second row comprising a third virtual depth plane corresponding to another of the first displays for rendering for the left eye, just below the first virtual depth plane, and adjacent to a fourth virtual depth plane, just below the second virtual depth plane, corresponding to another of the second displays for rendering for the right eye; and
   encoding signalling information indicative of a number of virtual depth planes in the first array and locations of the virtual depth planes in the first array in a header of the first array; and a transmission sub-system configured to provide a data channel for wireless transmission of the composite mosaic image as a packet from the first processing sub-system; and a second processing sub-system within the multi-focal head mounted display device and configured to receive the composite mosaic image packet, via the transmission sub-system, the second processing unit configured to time sequentially render the three-dimensional image content in the multi-focal head mounted display device based on the generated first array of virtual depth planes.

2. The system according to claim 1, wherein the first processing sub-system is further configured to:

add one or more boundary columns between the first virtual depth plane and the second virtual depth plane in the generated first array, and wherein the one or more boundary columns comprise a first set of additional pixels corresponding, at least in part, to the three-dimensional image content at adjacent pixels of the first virtual depth plane and the second virtual depth plane; and add one or more boundary rows between the first row and the second row in the generated first array, and wherein the one or more boundary rows comprise a second set of additional pixels corresponding, at least in part, to the three-dimensional image content at adjacent pixels of the first row and the second row in the generated first array.

3. The system according to claim 2, wherein the first set of additional pixels follow a colour gradient corresponding, at least in part, to colours of the adjacent pixels of the first virtual depth plane and the second virtual depth plane, and wherein the second set of additional pixels follow a colour gradient corresponding, at least in part, to colours of the adjacent pixels of the first row and the second row in the generated first array.

4. The system according to claim 2, wherein the second processing sub-system is configured to process the received generated first array to discard the one or more boundary columns and the one or more boundary rows, before further processing of the first array therein for rendering the three-dimensional image content.

5. The system according to claim 1, further comprising an inertial measurement unit associated with the multi-focal head mounted display device and configured to provide a pose data therefor, wherein the second processing sub-system is configured to process the first array to transform the first array based on the pose data to generate an intermediate array.

6. The system according to claim 5, wherein the second processing sub-system is configured to:

process the generated intermediate array to generate a second array, with a first row of the second array comprising a first row of pixels of each of the first virtual depth plane, the second virtual depth plane, the third virtual depth plane and the fourth virtual depth plane, and a second row of the second array comprising a second row of pixels of each of the first virtual depth plane, the second virtual depth plane, the third virtual depth plane and the fourth virtual depth plane; and process the generated second array to render the three-dimensional image content in the multi-focal head mounted display device.

7. The system according to claim 6, further comprising a buffer memory associated with the second processing sub-system, wherein the buffer memory is configured to temporarily store the first row of the second array when generated by the second processing sub-system, to be used along with the second row of the second array when generated, for processing of the generated second array by the second processing sub-system.

8. The system according to claim 1, wherein the first processing sub-system is configured to discard one or more virtual depth planes having no substantial information related to three-dimensional image content from the plurality of virtual depth planes, while generating the first array.

9. The system according to claim 1, wherein the second processing sub-system is configured to decode the signalling information for pre-configuring the multi-focal head mounted display device prior to or in parallel to processing of the generated second array, for rendering of the three-dimensional image content in the multi-focal head mounted display device.

10. The system according to claim 1, wherein the transmission sub-system is configured to provide an auxiliary data channel for transmission of the header of the generated first array with the signalling information to the second processing sub-system.

11. The system according to claim 1, wherein the second processing sub-system is disposed internal to the multi-focal head mounted display device.

12. A method for rendering three-dimensional image content for display on a multi-focal display device, the multi-focal display device comprising a head mounted display device having at least two first displays aligned along a first optical path for rendering the three dimensional content as virtual depth planes for a left eye, and at least two second displays aligned along a second optical path for rendering the three dimensional content as virtual depth planes for a right eye, the method comprising:

using a first processing sub-system physically separated and external to the head mounted display device, the first processing sub-system configured to receive a volumetric three dimensional image and transcode the volumetric three dimensional image into a multiplane composite mosaic image for rendering by the multi-focal head mounted display device, the transcoding comprising:

processing the volumetric three-dimensional image to divide the volumetric three-dimensional image into the virtual depth planes for the left and right eyes, with each of the virtual depth planes containing a portion of the three-dimensional image content;

generating a composite mosaic image comprising a first array of the virtual depth planes, the first array comprising:

a first row comprising a first virtual depth plane corresponding to one of the first displays for rendering to the left eye, adjacent to a second virtual depth plane corresponding to one of the second displays for rendering to the right eye; and a second row comprising a third virtual depth plane corresponding to another of the first displays for rendering for the left eye, just below the first virtual depth plane, and adjacent to a fourth virtual depth plane corresponding to another of the second set of displays for rendering for the right eye;

encoding signalling information indicative of a number of virtual depth planes in the first array and locations of the virtual depth planes in the first array in a header of the first array; and wirelessly transmitting the composite mosaic image through a data channel to the multi-focal head mounted display device; and using a second processing sub-system within the multi-focal head mounted display device to:
  receive the composite mosaic image packet via the transmission sub-system; and
  time sequentially render the three-dimensional image content in the multi-focal head mounted display device based on the generated first array.

13. The method according to claim 12 further comprising:
processing the first array to transform the first array based on a pose data of the multi-focal head mounted display device to generate an intermediate array;

processing the generated intermediate array to generate a second array, with a first row of the second array comprising a first row of pixels of each of the first virtual depth plane, the second virtual depth plane, the third virtual depth plane and the fourth virtual depth plane, and a second row of the second array comprising a second row of pixels of each of the first virtual depth plane, the second virtual depth plane, the third virtual depth plane and the fourth virtual depth plane; and processing the generated second array to render the three-dimensional image content in the multi-focal head mounted display device.

14. The method according to claim 13 further comprising temporarily storing the first row of the second array when generated, to be used along with the second row of the second array when generated, for processing of the generated second array.

15. The system according to claim 1, wherein the data channel is configured for compression and transmission of the composite mosaic image of virtual depth planes.

16. The method according to claim 12, wherein transmitting the composite mosaic image of virtual depth planes to the multi-focal head mounted display device comprises transmitting the composite mosaic image of virtual depth planes as a packet.

17. The method according to claim 12, wherein transmitting the composite mosaic image of virtual depth planes to the multi-focal head mounted display device comprises transmitting the composite mosaic image of virtual depth planes in a compressed format.

* * * * *